United States Patent Office 3,078,985
Patented Feb. 26, 1963

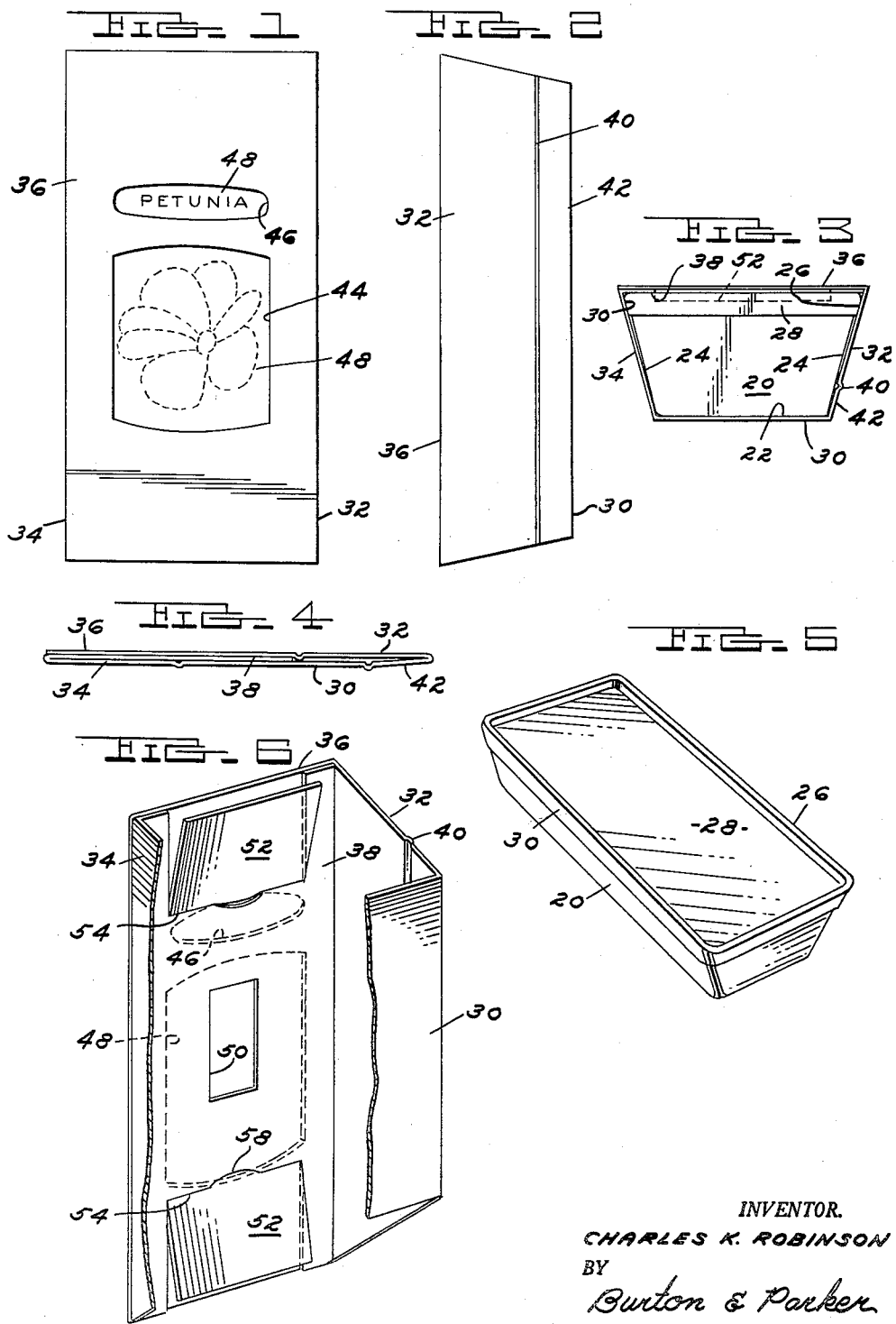
Feb. 26, 1963 C. K. ROBINSON 3,078,985
COMBINED SEED PLANTER BOX, PACKET, AND CONTAINER
Filed Jan. 9, 1961 2 Sheets-Sheet 1
INVENTOR.
CHARLES K. ROBINSON
BY
Burton & Parker
ATTORNEYS

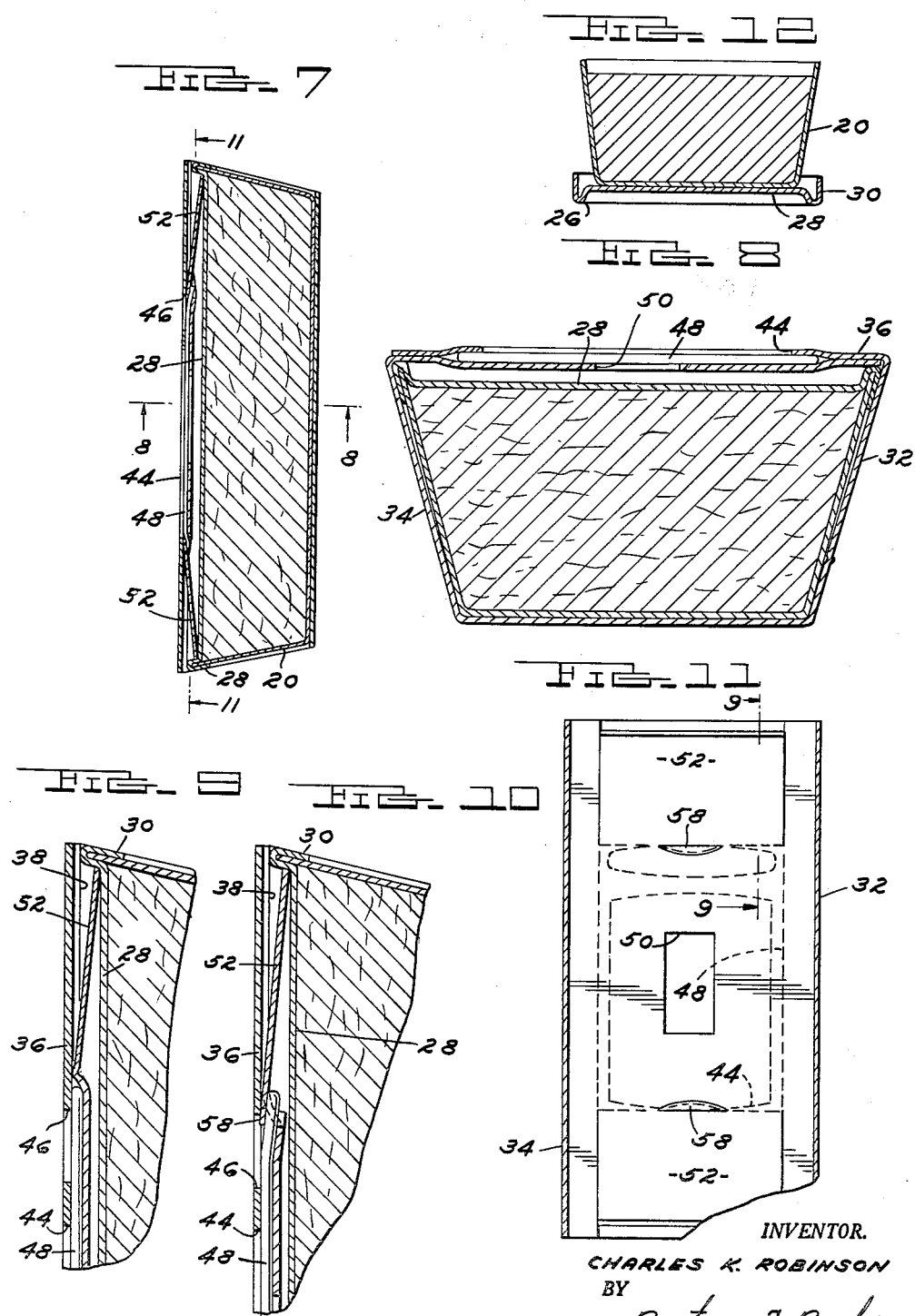

3,078,985
COMBINED SEED PLANTER BOX,
PACKET, AND CONTAINER
Charles K. Robinson, Memphis, Tenn., assignor, by mesne assignments, to Ferry-Morse Seed Co., Mountain View, Calif., a corporation of Michigan
Filed Jan. 9, 1961, Ser. No. 81,318
5 Claims. (Cl. 206—47)

This invention relates to an assembly of a seed planter box carrying a seed growing mixture, a seed packet containing seed to be planted in the box, and a container for both the planter box and the seed packet.

An object is the provision of the assembly defined above wherein a construction and arrangement of the components in the assembly is such that the planter box and the seed packet are removably held within the container for storage and display within a store and the packet is so supported that a portion of one side wall is exposed to view.

Another object is the provision of an assembly of components of the character defined wherein the separate components are so formed as to cooperate with each other in the assembly to hold the same in place therein while permitting readly removal of the independent components from the container.

Heretofore planter boxes containing a suitable growing mixture have been planted with seed and sold upon the market, but one difficulty attending such procedure is that the box must be sold within a limited time. Moreover, it is not possible to carry the boxes with the growing mixture and the seed therein over to another season if they are not sold during the current season. An advantage of the instant combination is that if the assembly is not sold, the seed packet can be removed and destroyed at the end of the season and the container and planter box may be carried over until the next year and a new seed packet assembled therewith for such next year's season.

A meritorious feature of the invention is that the planter box is so formed and disposed within the container and the container is so constructed and arranged that means are provided to releasably interconnect the box with the container to maintain the planter box in place therein against accidental displacement while permitting removal therefrom when desired.

Another object is the provision of an assembly of the character just described wherein a seed packet is removably supported with the major portion of its front face exposed to view and such seed packet cooperates with the parts that interconnect the container with the planter box to help maintain such interconnection.

More particularly, the top of the container is provided with flaps hinged thereto and swingable inwardly into engagement with the planter box to hold the same within the container. Preferably the planter box lid has a depressed portion into which said flaps are swung to hold the box.

A further meritorious feature is that the container is formed of sheet material folded to form an open-ended box having a top wall, a bottom wall, and two opposite side walls and wherein the bottom wall is of less width than the top wall and the two side walls extend between the top wall and the bottom wall and slope upwardly and outwardly away from the bottom wall toward the top wall. Each side wall is hinged to the top wall and to the bottom wall. One of the side walls is provided with an intermediate hinge line defining a side wall panel, which intermediate hinge line is parallel to the hinge line between the side wall and the bottom wall whereby the container when empty may be folded flat.

Other objects, advantages and meritorious features will more fully appear from the following description, claims, and accompanying drawings.

In the drawings, FIG. 1 is a top plan view of the assembly of the container, planter box, and seed packet.

FIG. 2 is a side elevation of the assembly shown in FIG. 1.

FIG. 3 is an end elevation of the assembly shown in FIG. 1.

FIG. 4 is an end elevation of the container folded flat with the planter box removed.

FIG. 5 is a perspective of the planter box per se.

FIG. 6 is an interior fragmentary perspective showing the inside of the top of the container.

FIG. 7 is a longitudinal sectional view through the assembly.

FIG. 8 is a horizontal sectional view taken on the line 8—8 of FIG. 7.

FIG. 9 is a fragmentary sectional view taken on the line 9—9 of FIG. 11.

FIG. 10 is a fragmentary longitudinal sectional view taken on a line parallel to line 9—9 but through the tab of the flap.

FIG. 11 is a sectional view taken on the line 11—11 of FIG. 7 partly broken away.

FIG. 12 is a view of the planter box seated within the inverted lid as in use.

The assembly consists of a planter box which may be formed of plastic or aluminum film or any other suitable material. The bottom portion of this box is indicated by the numeral 20. It is dish shaped in that the side walls slope upwardly and outwardly away from the bottom wall. The bottom wall is indicated as 22 and the opposed side walls as 24. This planter box is filled with a suitable growing agent which may consist of an appropriate mixture of growing materials such as vermiculite, peat moss, fertilizer, etc. The box is provided with a lid or cover indicated as 26. This lid 26 has a depressed central area 28 and a marginal rim portion 30. The flange which forms the rim has a width so that it overhangs the outer side wall of the box to a greater extent than the depth of the depressed area 28 as shown in FIG. 12.

The container itself may be formed of cardboard or the like folded so as to provide an open-ended carton having a bottom wall 30 and opposite side walls 32 and 34 which extend upwardly and outwardly from the bottom wall to the top wall. The top wall comprises an upper ply 36 and a lower ply 38 which overlap each other and are secured together as shown more particularly in FIGS. 4 and 6. The two side walls are secured to the bottom wall portion 30 by hinge or crease lines. Each side wall is secured to its top wall portion by hinge or crease lines, all as shown particularly in FIG. 4. One side wall portion is provided with a second hinge line indicated as 40 which extends parallel to but spaced from the hinge line that connects such side wall with the bottom wall, forming a side wall panel portion 42 whereby this side wall area may be folded upon itself as shown in FIG. 4 to permit the dish-shaped planter box to be folded flat as shown. The side wall may be completely unfolded as shown in FIG. 3 so as to permit the planter box to stand upright with equal area opposed sloping side walls.

The upper ply of the top wall is provided with an opening 44 and as shown in FIG. 1 with a second opening 46 that extends therethrough and through which a seed packet disposed underneath this top ply may be viewed. In FIG. 1 such a seed packet is indicated as 48 and the major portion of its front face is exposed to view through the opening 44 while another portion of its front face which carries the name of the particular seed is exposed to view through the opening 46. The lowermost ply or layer of the top portion of the container, identified as 38, extends below the opening 44 as shown in FIG. 6 but is itself provided with a finger aperture 50 underlying the opening 44 but of substantially less area for a purpose hereinafter shown.

This lower ply 38 has cut therefrom two opposed flaps 52, one at each end of the assembly of apertures 46 and 48. These flaps are adapted to be folded interiorly of the container as shown in FIG. 6 along hinge lines 54. Each flap has a tab portion 58 shown particularly in FIGS. 6 and 10.

When a seed packet 48 is inserted below the openings 44 and 46 in the upper ply 36 of the top of the container, it is supported upon the lower ply 38, which lower ply is free from the upper ply around the margins of the openings 44 and 46 to permit the edge of the seed packet to be inserted thereunder. The ends of the seed packet engage underneath the tabs 58 and urge such tabs upwardly toward the upper ply. This causes the free ends of the tabs to be swung downwardly into the recessed lid of the planter box and to engage opposite ends of such recessed lid as shown in FIGS. 7, 9, and 10, thereby holding the planter box within the container. Furthermore, the extension of the tabs over the edges of the opposite ends of the seed packet 48 holds such packet removably in place within the top of the container.

When it is desired to remove the seed packet from the top of the container, such may be done by gripping the packet between the thumb and finger through the openings 44 and 50, being the openings in the upper ply and the lower ply. The packet may then be slid endwise enough to release it from underneath one of the flap tabs. This flap may then be flattened down within the plane of the lower ply. The packet may then be withdrawn over this flap and out between the upper and lower plies. A packet may be inserted by reversing the operation. If an assembly remains unsold and must be kept over until the next season, the seed packet which it carries may be removed and destroyed and the container and planter box kept over. A new seed packet may be assembled therewith at the beginning of the next season. This eliminates throwing the entire assembly away. It is apparent that when the components are assembled the major portion of the seed packet is exposed to view.

When it is desired to use the planter box for growing the seed, the seed may be planted therein according to the instructions carried on the packet, the planter box first being removed from the container. The detached lid of the planter box may be used as a pan to supprt the box as shown in FIG. 12 and water may be placed therein. Holes may be punched through the bottom of the planter box so that this water may soak up into the growing mixture. The height of the side flanges 30 of the inverted box lid is such as to extend upwardly overlapping the sides of the box.

What I claim is:
1. The combination with a planter box and a seed packet of a container for both comprising, in combination: a planter box having a bottom, four sides, and a lid; a seed packet; a container having a top, a bottom, and two opposite sides extending between the top and bottom; said container adapted to receive the planter box therewithin; said top of the container formed of two plies of material, the upper ply having a opening therethrough, the lower ply having a part extending below said opening and adapted to support a seed packet therebelow for viewing therethrough, said lower ply having two flaps hinged thereto at opposite ends of the opening through the upper ply, which flaps are swingable interiorly of the container into engagement with the box to hold the same within the container, said seed packet supported upon the lower ply below the opening of the upper ply with opposite ends of the seed packet releasably engaged with portions of said flaps.

2. The combination with a planter box and a seed packet of a container for both as defined in claim 1 characterized in that each flap is provided with a tab adjacent to its hinged end swingable upwardly to engage the adjacent end of the seed packet to hold the packet into position, said seed packet cooperating with the tabs of the flaps to hold the free ends of the flaps downwardly toward the planter box.

3. The combination with a planter box and a seed packet of a container for both as defined in claim 1 characterized in that the lid of the box is provided with a depressed area into which said flaps are swung downwardly and engaged to hold the box within the container, and the hinged edge of each flap is provided with a tab which is swung upwardly toward the upper ply adjacent to the end of the opening therethrough to hold the seed packet into position.

4. The combination with a planter box and a seed packet of a container for both comprising, in combination: a planter box having a bottom, four sides, and a lid extending between the sides of the interior of the box; a container having a bottom, a top, and two opposite sides connecting the top and bottom, said container adapted to removably receive therein the planter box; the lid of the planter box being disposed adjacent to the underside of the top of the container and said top of the container provided with means adapted to receive and support the seed packet with a portion of the face of the seed packet exposed to view; said top of the container characterized as comprising two overlapping layers of material and the upper layer being provided with an opening therethrough and the lower layer having a portion extending underneath the opening through the upper layer and the seed packet being disposed removably upon the lower layer below the opening in the upper layer to be viewed therethrough.

5. The combination with a planter box and a seed packet of a container for both comprising, in combination: a planter box having a bottom, four sides, and a lid extending between the sides of the interior of the box; a container having a bottom, a top, and two opposite sides connecting the top and bottom, said container adapted to removably receive therein the planter box; the lid of the planter box being disposed adjacent to the underside of the top of the container, said top of the container having a part provided with a window opening therethrough, said seed packet receivable underneath said part of the top for partial exposure through said window opening, said top of the container provided with flap portions swingable downwardly into engagement with the planter box to hold the same in place within the container and said top of the container also provided with other flap portions swingable to engage the said seed packet to hold the same in place with respect to the window opening of the container.

References Cited in the file of this patent
UNITED STATES PATENTS

| | | |
|---|---|---|
| 1,687,678 | Mallory | Oct. 16, 1928 |
| 2,039,442 | Mulford | May 5, 1936 |
| 2,116,652 | Adler | May 10, 1938 |
| 2,219,183 | Hartnett et al. | Oct. 22, 1940 |
| 2,238,818 | Mulford et al. | Apr. 15, 1941 |
| 2,518,711 | Mulford | Aug. 15, 1950 |
| 2,720,725 | Peerless | Oct. 18, 1955 |
| 2,904,170 | Hennesey et al. | Sept. 15, 1959 |